US012783924B2

(12) United States Patent
El Euch et al.

(10) Patent No.: US 12,783,924 B2
(45) Date of Patent: Nov. 3, 2026

(54) QUANTUM BLOCKCHAIN

(71) Applicant: Abu Dhabi University, Abu Dhabi (AE)

(72) Inventors: Hichem El Euch, Abu Dhabi (AE); Mohammed Abdellatif Abdelaal Zidan, Assuit (EG); Montasir Yousof Abdallah Qasymeh, Abu Dhabi (AE); Ashraf Khalil, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 853 days.

(21) Appl. No.: 18/129,912

(22) Filed: Apr. 3, 2023

(65) Prior Publication Data

US 2024/0330729 A1 Oct. 3, 2024

(51) Int. Cl.
*G06N 10/20* (2022.01)

(52) U.S. Cl.
CPC .................................... *G06N 10/20* (2022.01)

(58) Field of Classification Search
CPC ......... G06N 10/20; G06N 10/00; G06N 10/10
See application file for complete search history.

(56) References Cited

U.S. PATENT DOCUMENTS 11,477,015 B1 * 10/2022 Smith ................... H04L 9/0852
11,637,711 B2 * 4/2023 De La Rocha Gómez-Arevalillo ............. H04L 9/3236 713/175
11,669,833 B1 * 6/2023 Cheung .............. G06Q 20/3827 705/75
12,099,997 B1 * 9/2024 Hoffberg .............. G06Q 20/065
12,445,276 B2 * 10/2025 El Euch ................ H04L 9/0852
2023/0275759 A1 * 8/2023 Majumdar ............ H04L 9/3239 713/171
2023/0275765 A1 * 8/2023 Davis .................... H04L 9/3218 713/168
2025/0217695 A1 * 7/2025 Stockert ................. G06N 20/00
2025/0365168 A1 * 11/2025 Goudjil .................. G06N 10/80

OTHER PUBLICATIONS

KR 102311354 B1,Blockchain Transaction Method With Reduced Transaction Size Using Cryptographic Hash Algorithm, English Translation, Published Oct. 13, 2021 (Year: 2021).*
Z. Yang, T. Salman, R. Jain and R. D. Pietro, "Decentralization Using Quantum Blockchain: A Theoretical Analysis," in IEEE Transactions on Quantum Engineering, vol. 3, pp. 1-16, 2022, Art No. 4100716, doi: 10.1109/TQE.2022.3207111. (Year: 2022).*
Li, Qin, Efficient Quantum Blockchain with a Consensus Mechanism QPDoS, IEE Transactions on Information Forensics and Security, DOI 10/1109/TIFS.2022.3203316 Aug. 31, 2022 (Year: 2022).*
Li, Ya-Lin, et al., CN 117291273 A, Quantum Computing Blockchain System, English Translation, Filed Nov. 24, 2023 (Year: 2023).*
Wen, Xiao-jun, CN 111970130 B, Quantum Blockchain Establishing Method and System, English Translation, Filed Oct. 21, 2020. (Year: 2020).*

(Continued)

*Primary Examiner* — Barbara M Level

(57) ABSTRACT

A quantum method receives by a quantum circuit, electronic information from a first block within a blockchain. The quantum method generates, by the quantum circuit a hash for a second block within the blockchain. The quantum method stores the first block and the second block in a distributed ledger.

9 Claims, 8 Drawing Sheets

(56) References Cited

OTHER PUBLICATIONS

E.O. Kiktenko, Quantum-secured blockchain, arXiv:1705.09258v3, Jun. 3, 2018 (Year: 2018).*
Del Rajan (Victoria University of Wellington), et al, Quantum Blockchain using entanglement in time, arXiv:1804.05979v2 Apr. 18, 2019 (Year: 2019).*
H. Gharavi, J. Granjal and E. Monteiro, "Post-Quantum Blockchain Security for the Internet of Things: Survey and Research Directions," in IEEE Communications Surveys & Tutorials, vol. 26, No. 3, pp. 1748-1774, third quarter 2024, doi: 10.1109/COMST.2024.3355222. (Year: 2024).*
Li, Chuntang et al., Journal of Quantum Computing; Henderson vol. 1, Iss. 2, (2019): 49-63. DOI:10.32604/jqc.2019.06715 (Year: 2019).*
JP 2025510803 A, Quantum Timestamping, English Translation, Filed Feb. 14, 2023 (Year: 2023).*

* cited by examiner

| Item | Size (qubits) | Description |
|---|---|---|
| $\|NA\rangle$ | n | Used to store identifiers of the nodes in the network as basis states in the superposition. |
| $\|QD\rangle$ | m | Used to store the data of the blocks of the quantum distributed ledger. |
| $\|QH\rangle$ | k | Used to store the hash of the blocks of the quantum distributed ledger. |
| $\|QBH\rangle$ | k | Used to store the previous hash of the blocks of the quantum distributed ledger. |
| $\|CNA\rangle$ | n | Used to determine the identifiers of the nodes in the network that are used to store the quantum distributed ledger. |
| $\|CD\rangle$ | m | Used to load values of classical data of the new block(s) that are required to be stored in the quantum distributed ledger. |
| $\|CH\rangle$ | k | Used to load the hash code(s) of the new block(s) that are required to be stored in the quantum distributed ledger. |
| $\|CBH\rangle$ | k | Used to load the previous hash code(s) of the new block(s) that are required to be stored in the quantum distributed ledger. |
| $\|c_0\rangle$ | 1 | Used to mark by entanglement the designated nodes in the network. |
| $\|c_1\rangle$ | 1 | Used to create new basis states into the superposition of the quantum distributed ledger. |
| $\|c_2\rangle$ | 1 | Used to mark the vacuum states that will be used to store new block(s). |
| $\|GB\rangle$ | 1 | Used to decide if the current storing block is the genesis block or not. |

FIG. 2

QUANTUM BLOCKCHAIN

BACKGROUND

A blockchain is a type of distributed ledger that are securely linked blocks of data via cryptographic hashes via a set of nodes. Every block within the blockchain has a cryptographic hash, associated with the previous block in the blockchain, a timestamp, and transaction data. As each block contains information from the previous block, a chain is created. However, there is no current system or process that utilizes quantum computation circuit to manage the distributed ledgers, i.e., the blockchain.

BRIEF DESCRIPTION OF DRAWINGS

FIG. 2 is a diagram of an example table;

DETAILED DESCRIPTION OF PREFERRED EMBODIMENTS

The following detailed description refers to the accompanying drawings. The same reference numbers in different drawings may identify the same or similar elements.

Systems, devices, and/or methods described herein may provide for one or more quantum circuits that store and publish new accepted and validated, blocks in a quantum distributed ledger via a set of nodes in the network. In embodiments, a quantum circuit described herein stores each accepted block as a basis state in the superposition of the quantum ledger that stores M of quantum blocks. Each basis state stores the block's data, the hash of the current block, and the hash of the previous block. In embodiments, to protect the block from computing hacking attempts to tamper with a blockchain, the invented circuit sets up the probability amplitude of each basis state to encode the hash of the current block. This because even if there is a hacking attempt to modify the hash of the current block that is stored in binary inside the basis state, he cannot modify the probability amplitude. Thus, the systems, devices, and/or methods described herein make the validation process is trusted during validation rounds in the consensus algorithms. In embodiments, the systems, devices, and/or methods described herein are used to construct the quantum ledgers in the blockchain nodes and then publish the accepted new blocks in the quantum blockchain nodes. Accordingly, the associated algorithm with the quantum circuit exponentially reduces the memory space for the blockchain when compared with a blockchain that does not use a quantum circuit.

In embodiments, a quantum circuit may store the blocks of a distributed ledger (e.g., a blockchain) as follows:

$$|Qledger\rangle = \sum_{i=1}^{M}\sqrt{\frac{H_i}{M}}\,|D_i, QH_i, QBH_{i-1}\rangle$$

In embodiments, where the register $|D\rangle$ of size n qubits stores data of the $i^{th}$ block such as transactions, block creator, time stamp, etc. In embodiments, the register $|BH\rangle$ of size k is used to store the hash of a current block in the binary form. In embodiments, the register $|QBH\rangle$ of size k is used to store the hash of a previous block in the binary form such that if i−1=0 then $|BPH_{i-1}\rangle$ refers to the hash of the genesis block. In embodiments, the probability amplitude of each block which has index i is $$\sqrt{\frac{H_i}{M}}$$

where $H_i$ is a hash of a current block, such that M is a predefined number which assigns the number of the blocks allowed to be stored in a quantum ledger such that $$\sum_{i=1}^{M}\left|\sqrt{\frac{H_i}{M}}\right|^2 = 1.$$

Figure 1:
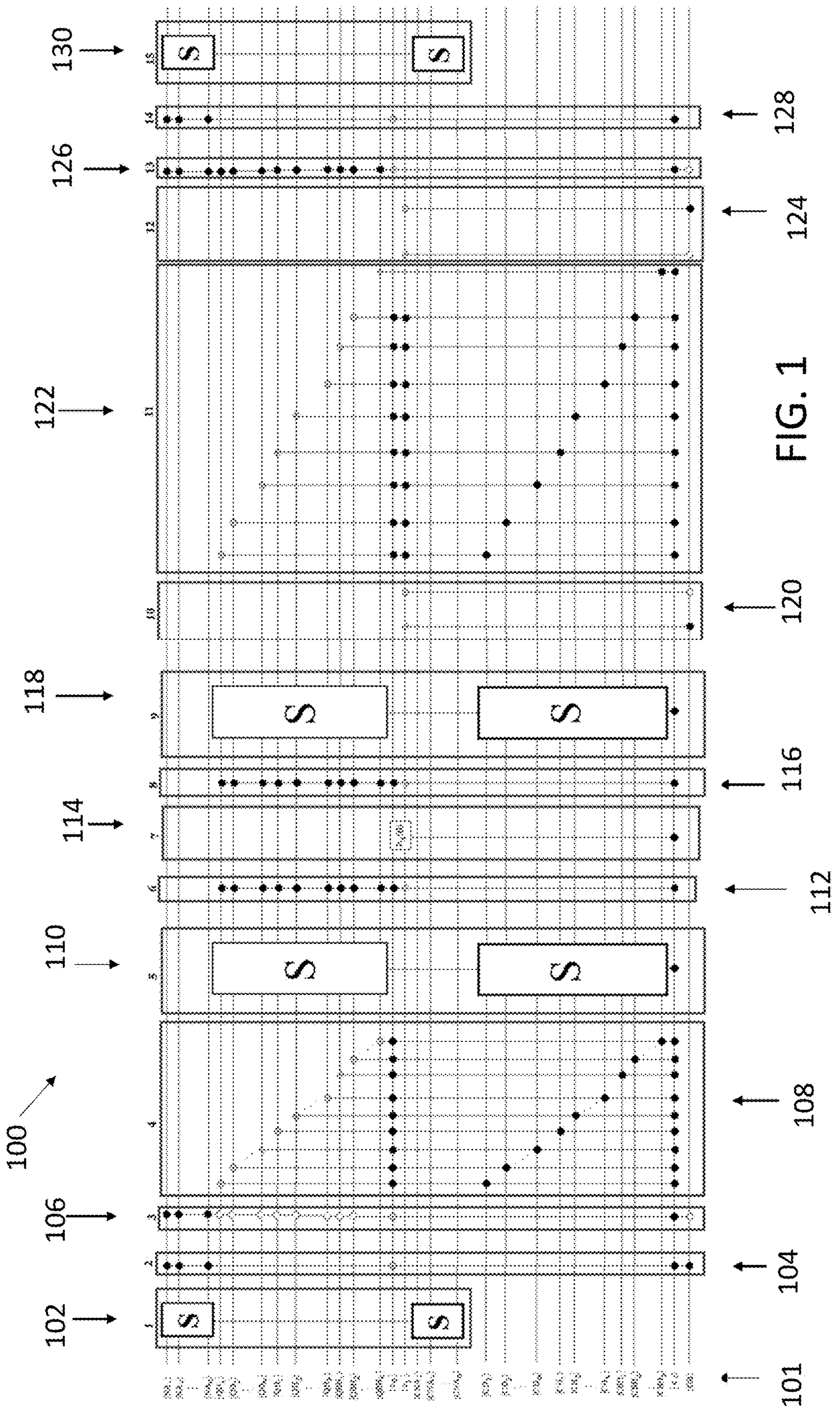
FIG. 1 is a diagram of an example quantum circuit.

FIG. 1 is a diagram showing an example quantum circuit of a quantum blockchain. In embodiments, upon completion, each node that has identifier $|NA^j\rangle$ in the network will have a distributed quantum ledger as follows:

$$|NA^j d^k\rangle = |NA^j\rangle.\sum_{i=1}^{M}\sqrt{\frac{H_i}{M}}\,|D_i, QH_i, QBH_{i-1}\rangle.$$

While FIG. 1 describes the steps of the quantum circuit, FIG. 2 describes an example table that describes the features of portion 101 described in FIG. 1.

As shown in FIG. 1, at step 1 (102), the identifiers of the set of nodes that are needed to store the distributed ledger are loaded via the n qubits of the register |CNA>. In embodiments, an S operator, of size n, is applied between each qubit of the register $|CNA_i>$ and corresponding $|NA_i>$ qubit, where i=1, 2, . . . , n. In embodiments, the S operator applies n C-NOT gates and n quantum X-gates between the qubit $|CNA_i>$ as the control qubit and the qubit $|NA_i>$ as the target qubit, where i=1, 2, . . . , n.

Figure 3:
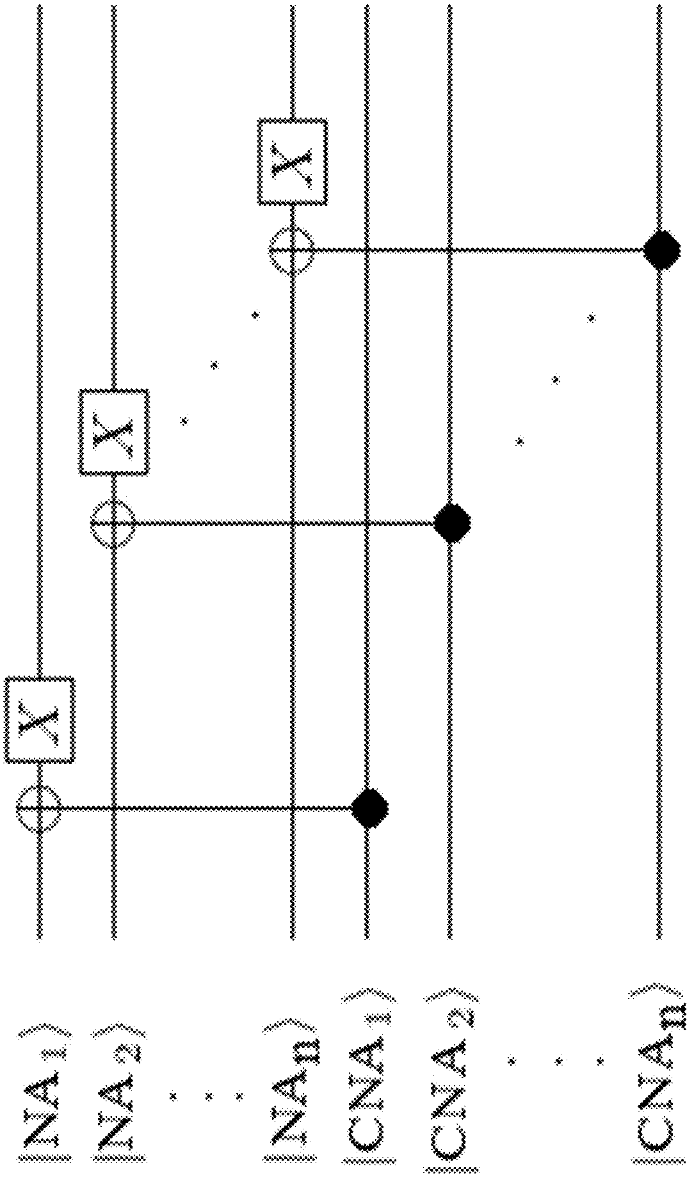
FIG. 3 is a diagram of an example quantum circuit.

FIG. 3 describes an example quantum circuit of S operator of size n. In embodiments, this quantum circuit selects identifiers of the nodes, that are predefined by the register |CNA>, from all identifiers available via the register |NA>, of size n qubits. After applying step 1, the basis states of the register |CNA> that represent the designated nodes are transformed into the state $|1^{\otimes n}$.

In FIG. 1, at step 2 (104), a Toffoli gate $$T^{n+2}_{NA_1 NA_2 \ldots NA_n c_2 GB c_0}$$

is applied. In embodiments, this gate has n+2 control qubits which are n qubits of the register |NA>, $|c_2>$, and the qubit |GB> such that the target qubit is $|c_0>$. In embodiments, step 2 entangles the qubit $|c_0>$ with the register |NA>, the qubit$|c_2>$, and the qubit|GB>. Thus, step 2 marks by entanglement of the basis states in the nodes that will be used for adding the genesis block, which is the first block in the blockchain.

Figure 4:
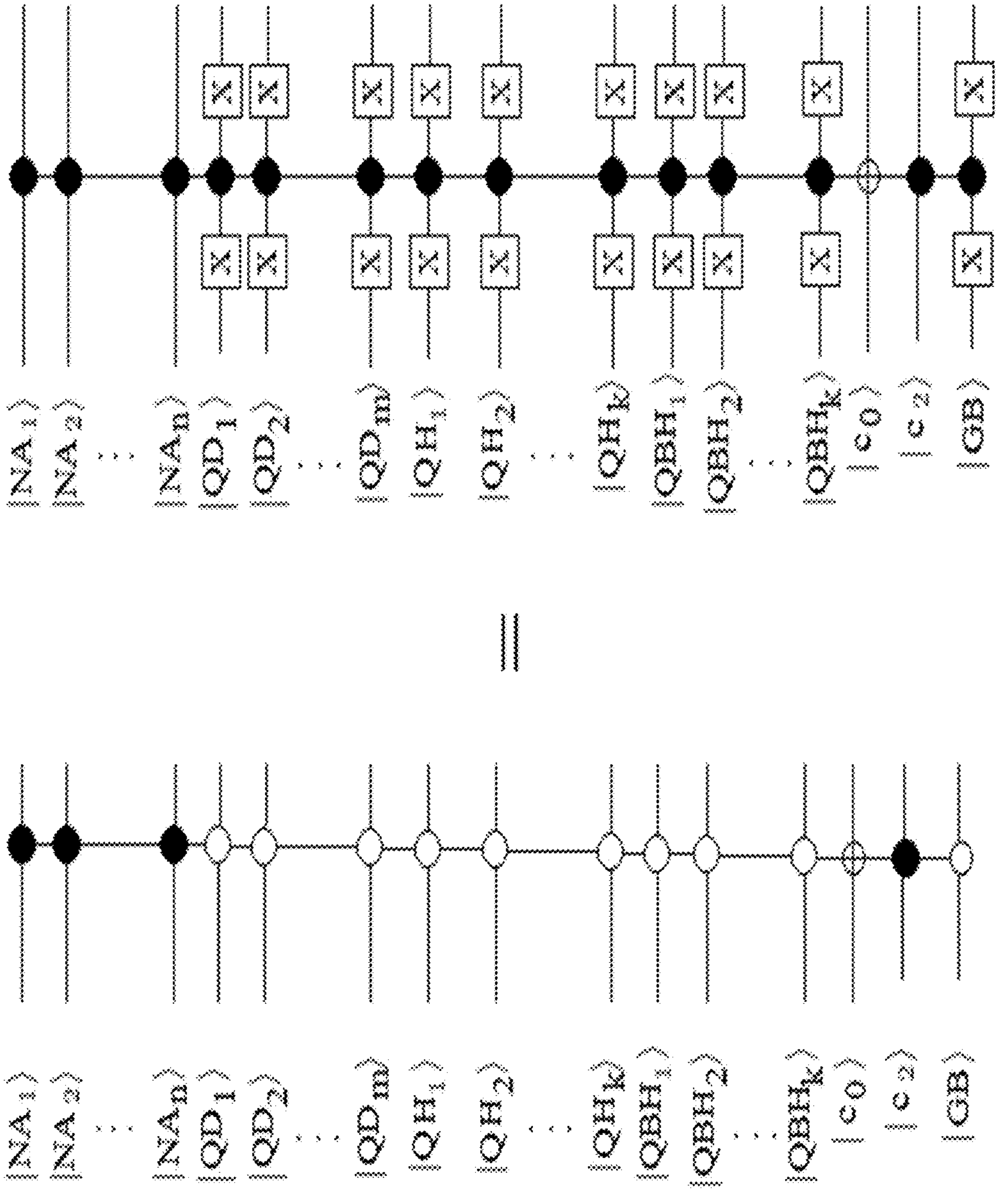
FIG. 4 is a diagram of an example quantum circuit.

In FIG. 1, at step 3 (106), a Toffoli gate $$T^{n+m+2k+2}_{NAQDQHQBHc_2GBc_0}$$

is applied. In embodiments, this Toffoli gate has n+m+2k+2 control qubits, which are n qubits of the register |NA>, m qubits of the register |QD>, k qubits of the register |QH>, k qubits of the register |QBH>, the qubit $|c_2>$, and the qubit |GB> such that the target qubit is $|c_0>$. Thus, in step 3, this gate will be activated when the basis states have the state $$|1>^{\otimes n}, |0>^{\otimes m}, |0>^{\otimes k}, |0>^{\otimes k}, |1>, \text{ and } |0>,$$

for the registers |NA>, |D>, |QH>, |QBH>, $|c_2>$, |GB>, respectively. In embodiments, FIG. 4 shows the quantum circuit of $$T^{n+m+2k+2}_{NAQDQHQBHc_2GBc_0}.$$

In embodiments, step 3 marks by entanglement with the qubit $|c_0>$, the qubits that have vacuum states in the nodes of the network that has given identifiers determined using the register |NA> for any block that is not the genesis block.

In FIG. 1, at step 4 (108), the data of the block, the current hash of the block, and the hash of the previous block of a given new accepted and validated block(s) that is (or are) required to be added and published in the quantum distributed ledger is performed by applying m gates of $$T^3_{c_2c_0CD_hQD_h},\ k \text{ gates of } T^3_{c_2c_0CH_jQH_j}, \text{ and } k \text{ gates of } T^3_{c_2c_0CBH_jQBH_j},$$

respectively, such that j=1, 2, . . . , k, and h=1, 2, . . . , m.

In FIG. 1, at step 5 (110), a set of m+2k size of the controlled-S operators consisting of m+2k controlled-controlled-NOT gates are applied between the control qubits of the register |CD>, |CH>, |CBH>, and $|c_2>$ as control qubits and each qubit of the register |QD>, |QH>, and |QBH> as target qubits, respectively. In embodiments, m+2k of quantum CNOT gates are applied to the qubits of the registers |CD>, |CH>, |CBH>, as control qubits and the qubits of the registers |QD>, |QH>, |QBH> as the target qubits, respectively.

In FIG. 1, at step 6 (112), the gate $$T^{m+2k+2}_{QDQHQBHc_2c_0c_1}$$

is applied. In embodiments, this particular gate has m+2k+2 control qubits, which are m qubits of the register |QD>, k qubits of the register |QH>, k qubits of the register |QBH>, the qubit $|c_2>$, the qubit $|c_0>$, and the target is the qubit $|c_1>$.

In FIG. 1, at step 7 (114), the controlled-$R_4(\theta)$ gate is applied. This gate acts on 3-qubits which is controlled by the control qubit $|c_2>$, and has two target qubits, namely $|c_0>$, and $|c_1>$. In embodiments, the proposed $R_4(\theta)$ gate is defined as follows:

$$R_4(\theta) = \begin{pmatrix} 1 & 0 & 0 & 0 \\ 0 & 1 & 0 & 0 \\ 0 & 0 & a_i & b_i \\ 0 & 0 & -b_i & a_i \end{pmatrix}$$

In embodiments, the parameters $a_i$ and $b_i$ are used to create a weighted superposition in distributed quantum ledger then are calculated as follows:

$$b_i = \frac{\sqrt{\frac{M-\alpha_i}{M}}}{a_{i-1}},\ a_i = \sqrt{1-b_i^2}, \text{ and } a_0 = 1$$

In FIG. 1, at step 8 (116), The gate $$T^{m+2k+2}_{QDQHQBHc_2c_0}$$

is applied to undo the effect of step 6. In FIG. 1, at step 9 (118), to undo the effect of step 5 (110), a set of m+2k size of the controlled-S operators, consisting of a set of m+2k of controlled-CNOT gates, are applied between each qubit of the registers |CD>, |CH>, |CBH>, and $|c_2>$ as control qubits and each qubit of the registers |QD>, |QH>, and |QBH> as target qubits, respectively. Accordingly, in embodiments, m+2k of CNOT gates are applied such that the control qubit is $|c_2>$ and target qubits are the qubits of the registers |QD>, |QH>, |QBH> as the target qubits, respectively.

In FIG. 1, at step 10 (120), two CNOT gates are applied. In embodiments, the first CNOT gate is applied on the control qubit |GB>, and on the qubit $|c_1>$ as the target qubit. This gate flips the state of the qubit $|c_1>$ only if the state of the qubit |GB> is |1>. In embodiments, the second CNOT gate flips the state of the target qubit $|c_1>$ only if the state of the control qubit |GB> is |0>.

In FIG. 1, at step 11 (122), a set of m gates of $$T^4_{c_2}CD_hc_1c_0QD_h,\ k \text{ gates of } T^4_{c_2CH_jc_1c_0QH_j},$$
$$\text{and } k \text{ gates of } T^4_{c_2CBH_jc_1c_0QBH_j}$$

are applied to retrieve the vacuum states, where h=1, 2, . . . , m, and j=1, 2, . . . , k. In embodiments, this step 11 (122) is applied to undo the effect of Step 4 (108) on the vacuum states after publishing and storing a new valid block, or blocks.

In FIG. 1, at step 12 (124), two CNOT gates are applied. In embodiments, the first CNOT gate is applied on the control qubit |GB>, with the qubit $|c_1>$ as the target qubit. Thus, the first CNOT gate flips the state of the qubit $|c_1>$ only if the state of the qubit |GB> is |0>. In embodiments, the second CNOT gate is applied on the control qubit |GB>, with the qubit $|c_1>$ as the target qubit. Thus, this second CNOT gate flips the state of the qubit $|c_1>$ only if the state of the qubit |GB> is |1>. Thus, step 12 removes the effect of step 10 (120) after publishing and storing a new valid block, or blocks.

In FIG. 1, at step 13 (126), the Toffoli gate $$T^{n+m+2k+2}_{NAQDQHQBHc_2GBc_0}$$

is applied. In embodiments, this Toffoli gate has n+m+2k+2 control qubits, which are n qubits of the register |NA>, m qubits of the register |QD>, k qubits of the register |QH>, k qubits of the register |QBH>, the qubit $|c_2>$, and the qubit |GB> while the target qubit is $|c_0>$. Thus this Toffoli gate will be active for the basis states $$|1>^{\otimes n}, |1>^{\otimes m}, |1>^{\otimes k}, |1>^{\otimes k}, |1>, \text{ and } |0>,$$

for the registers |NA>, |QD>, |QBH>, |QBH, $|c_2>$, |GB>, respectively. In embodiments, step 13 (126) also undoes the effect of step 3 (106).

In FIG. 1, at step 14 (128) the gate $$T^{n+1}_{NA_1 NA_2 \ldots NA_n c_2 c_0}$$

is applied that is controlled by n+1 qubits of the register |NA>, and the qubit $|c_2>$, where the target qubit is $|c_0>$. In embodiments, this gate flips the state of the qubit $|c_0>$ when the state of the register $$|NA> = |1>^{\otimes n},$$

and the state of the qubit $|c_2>=|1>$. In embodiments, step 14 (128) removes the effect of step 2 (104) after publishing and storing a new valid block, or blocks.

In FIG. 1, at step 15 (130), an S-operator, of size n, is applied between each qubit of the register $|CNA_i>$ and corresponding $|NA_i>$ qubit, where i=1, 2, . . . , n. In embodiments, step 15 removes the effect of step 1 after publishing and storing a new valid block, or blocks.

As a non-limiting example, the proposed blockchain circuit, circuit 100 may be used to publish and store a quantum distributed ledger that consists of two accepted valid blocks on two nodes of a network. In embodiments, the first block is the genesis block that has data 11, hash 01, and previous hash 00. In embodiments, the second block has data 01, hash 10, and previous hash 01. Hence, after executing the proposed circuit, the state of the distributed quantum ledgers (the quantum blockchain of the two nodes) is as follows:

$$|Qledger\rangle = \sqrt{\frac{1}{16}}|0,11,01,00\rangle + \sqrt{\frac{1}{16}}|1,11,01,00\rangle + \sqrt{\frac{2}{16}}|0,01,10,01\rangle + \sqrt{\frac{2}{16}}|0011001\rangle + \sqrt{\frac{5}{16}}|0,00,00,00\rangle + \sqrt{\frac{5}{16}}|1,00,00,00\rangle$$

Figure 5:
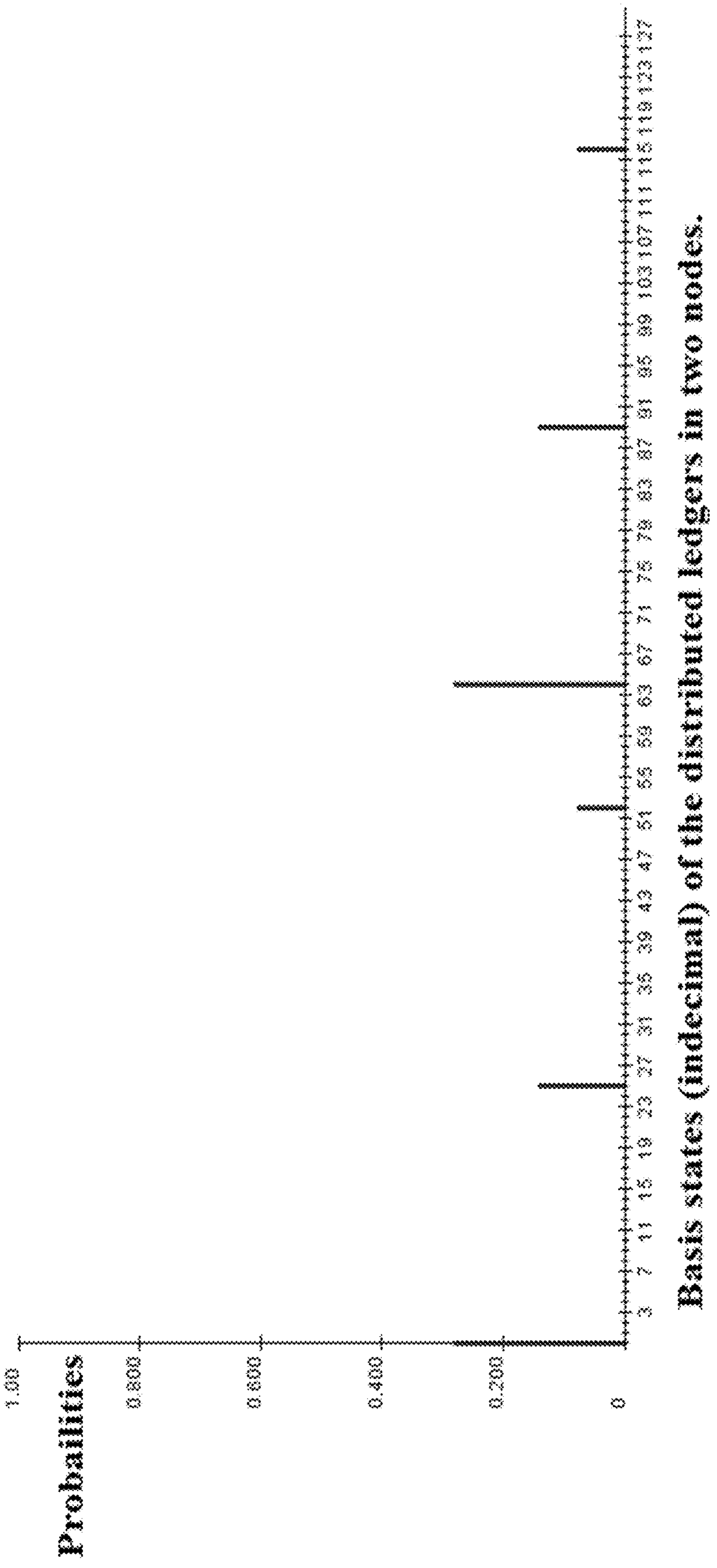
FIG. 5 is a diagram of an example graph.

In this non-limiting example, after applying the proposed quantum circuit 2 times, the results of simulations using Javantum simulator are shown in FIG. 5. As shown in FIG. 5, the horizontal, and the vertical lines represent, the basis states in the superposition versus the probabilities of these basis states in the superposition that implements the distributed ledger, respectively. Accordingly, the systems, methods, and/or devices described herein provide for publishing and storing two different accepted and valid blocks via a blockchain consists of two nodes. In embodiments, based on the quantum blockchain circuit in circuit 100, the simulation accuracy is performed with fidelity of 99.98%.

Figure 6:
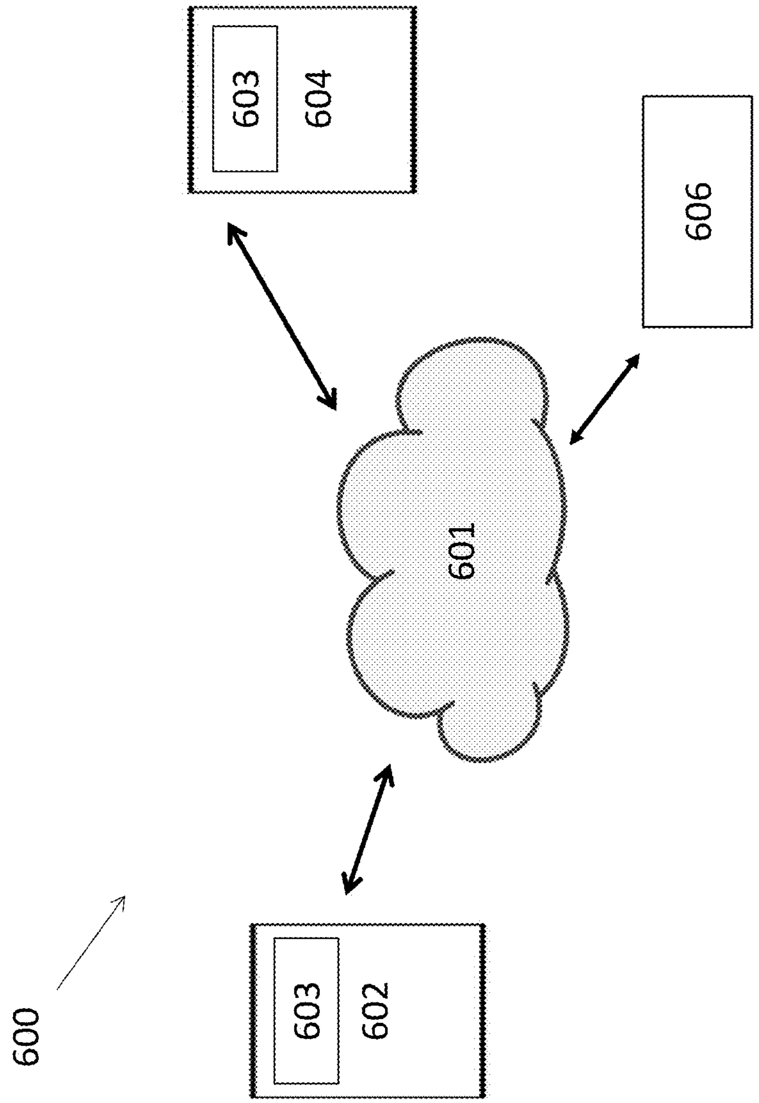
FIG. 6 is a diagram of an example computing network environment.

FIG. 6 is a diagram of example environment 600 in which systems, devices, and/or methods described herein may be implemented. FIG. 6 shows network 601, application 603, user device 602, user device 604, and blockchain management system 606.

Network 601 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or alternatively, network 601 may include a cellular network, a public land mobile network (PLMN), a second generation (2G) network, a third generation (3G) network, a fourth generation (4G) network, a fifth generation (5G) network, and/or another network.

In embodiments, network 601 may allow for devices describe any of the described figures to electronically communicate (e.g., sending blockchains, bitcoins, using emails, electronic signals, URL links, web links, electronic bits, fiber optic signals, wireless signals, wired signals, etc.) with each other so as to send and receive various types of electronic communications.

User device 602 and/or 604 may include any computation or communications device that is capable of communicating with a network (e.g., network 601). For example, user device 602 and/or user device 604 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), a digital audio recorder (DUR), a digital watch, a digital glass, or another type of computation or communications device.

User device 602 and/or 604 may receive and/or display content. The content may include objects, data, images, audio, video, text, files, and/or links to files accessible via one or more networks. Content may include blockchains and/or other types of distributed ledgers. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 602 and/or 604. User device 602 and/or 604 may have a touch screen and/or a keyboard that allows a user to electronically interact with an electronic application. In embodiments, a user may swipe, press, or touch user device 602 and/or 604 in such a manner that one or more electronic actions will be initiated by user device 602 and/or 604 via an electronic application.

User device 602 and/or 604 may include a variety of applications, such as, for example, a blockchain-based application, an e-mail application, a telephone application, a camera application, a video application, a multi-media application, a music player application, a visual voice mail application, a contacts application, a data organizer application, a calendar application, an instant messaging application, a texting application, a web browsing application, a blogging application, and/or other types of applications (e.g., a word processing application, a spreadsheet application, etc.). In embodiments, user device 602 and/or 604 may receive blockchains without using an associated application (such as electronic application 603).

Electronic application 603 may be capable of interacting with user device 602, user device 604, and/or blockchain management system 606 to automatically and electronically receive electronic information for one or more persons. In embodiments, electronic application 603 may be electronically configured to validate manage blockchains (as described in FIGS. 1-5). While FIG. 6 shows electronic application 603 on user device 602 and user device 604, some or all the electronic processes performed by electronic application 603 may be stored by blockchain management system 606.

Blockchain management system 606 may include one or more computational or communication devices that gather, process, store, and/or provide information relating to one or more electronic pages associated with electronic application 603 that is searchable and viewable over network 601. In embodiments, blockchain management system 606 may include one or more servers. In embodiments, the one or more servers of blockchain management system 606 may include one or more databases. In embodiments, blockchain management system 606 may manage one or more blockchains associated with user devices 602, 604, and/or electronic application 603.

Figure 7:
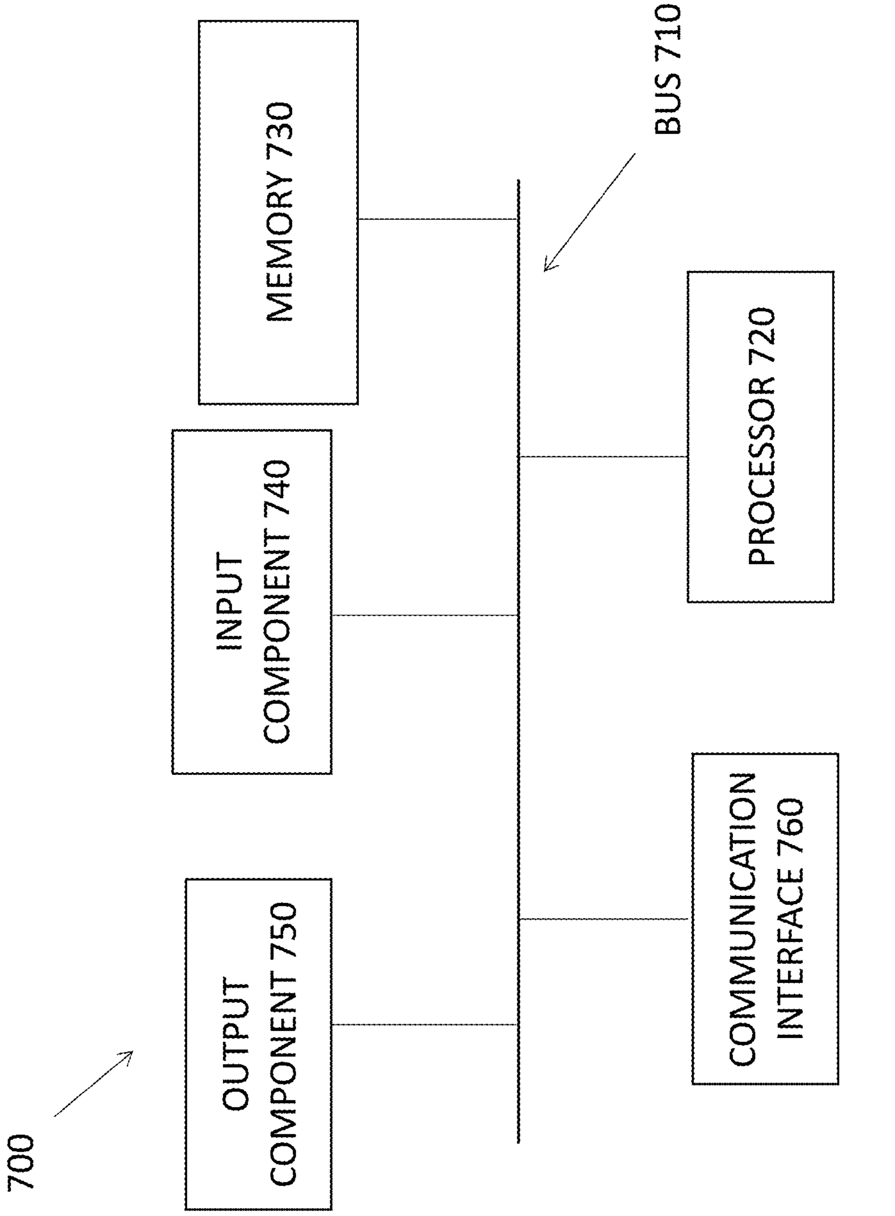
FIG. 7 is a diagram of an example computing device.

FIG. 7 is a diagram of example components of a device 700. In embodiments, the blockchain/distributed ledger descriptions may be stored across multiple devices 700. Device 700 may correspond to a computing device, such as devices that may use circuit 100. Device 700 may be associated with user device 602, user device 604, and/or blockchain management system 606. As shown in FIG. 7, device 700 may include a quantum bus 710, a processor 720, a memory 730, quantum input component 740, quantum output component 750, and a communications interface 760. In other implementations, device 700 may contain fewer components, additional components, different components, or differently arranged components than depicted in FIG. 7. Additionally, or alternatively, one or more components of device 700 may perform one or more tasks described as being performed by one or more other components of device 700.

Bus 710 may include a path that permits communications among the components of device 700. Processor 720 may include one or more processors, microprocessors, and/or processing logic (e.g., a field programmable gate array (FPGA), quantum teleportation devices, quantum communication devices, quantum computing circuits, quantum encryption applications and/or an application specific integrated circuit (ASIC)) that interprets and executes instructions. Memory 730 may include any type of dynamic storage device that stores information and instructions, for execution by processor 720, and/or any type of non-volatile storage device that stores information for use by processor 720. Input component 740 may include a mechanism that permits a user to convert classical information to quantum input information to device 700, such as a quantum circuit, a quantum-based application, a keyboard, a keypad, a button, a switch, voice command, etc. Output component 750 may include a mechanism that outputs information and transforms quantum information to classical information to be provided to the user, such as a display, a speaker, one or more light emitting diodes (LEDs), etc.

Communications interface 760 may include any transceiver-like mechanism that enables device 700 to communicate with other devices and/or systems. For example, communications interface 760 may include an Ethernet interface, an optical interface, a coaxial interface, a wireless interface, or the like and quantum-to-classical and vice versa unit.

In another implementation, communications interface 760 may include, for example, a transmitter that may convert baseband signals from processor 720 to radio frequency (RF) signals and/or a receiver that may convert RF signals to baseband signals. Alternatively, communications interface 760 may include a transceiver to perform functions of both a transmitter and a receiver of wireless communications (e.g., radio frequency, infrared, visual optics, quantum wireless, quantum channels, quantum fiber optics, quantum teleportation, quantum communication devices/networks, quantum encryption devices, etc.), wired communications (e.g., conductive wire, twisted pair cable, coaxial cable, transmission line, fiber optic cable, waveguide, single-photon channels, multi-photon channels, etc.), or a combination of wireless and wired communications.

Communications interface 760 may connect to an antenna assembly (not shown in FIG. 7) for transmission and/or reception of the RF signals, and/or quantum channels. The antenna assembly may include one or more antennas to transmit, quantum channels and/or receive RF signals over the air. The antenna assembly may, for example, receive RF signals and/or quantum information from communications interface 760 and transmit the RF signals over the air, and receive RF signals over the air and provide the RF signals to communications interface 760. In one implementation, for example, communications interface 760 may communicate with a network (e.g., a wireless network, quantum network, quantum channel, wired network, Internet, quantum internet, etc.). In embodiments, an antenna may be implemented by quantum teleportation protocols, quantum communication protocols and/or quantum encryption protocols.

As will be described in detail below, device 700 may perform certain operations. Device 700 may perform these operations in response to processor 720 executing software instructions (e.g., computer program(s)) contained in a computer-readable medium, such as memory 330, a secondary storage device (e.g., hard disk, CD-ROM, etc.), or other forms of QRAM, RAM or ROM. A computer-readable medium may be defined as a non-transitory memory device. A memory device may include space within a single physical memory device or spread across multiple physical memory devices. The software instructions may be read into memory 730 from another computer-readable medium or from another device. The software instructions contained in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

Figure 8:
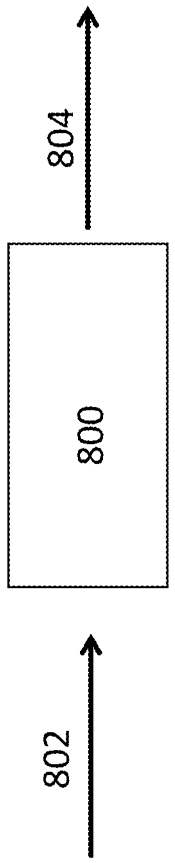
FIG. 8 is a diagram of an example computing device.

FIG. 8 is an example diagram of a computing device 800. FIG. 8 describes device 800, input 802, and output 804. In embodiments, device 800 may a computing device with features/structures similar to that described in FIG. 8. In embodiments, device 800 may be a computing device that is part of a laptop, desktop, tablet, smartphone, quantum computer, quantum computing device, quantum communication device, quantum teleportation device, quantum encryption device, quantum internet device, and/or any other device.

In embodiments, device 800 may receive communication 802, analyze communication 802, and generate output 804.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, and storing, it will be understood that these example actions are occurring within an electronic computing, electronic networking, quantum computing and/or quantum networking environment (such as described in FIG. 6) and may require one or more computing devices, as described in FIG. 7 or FIG. 8 to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices, quantum computer, cloud quantum circuit/computer, quantum communication devices, quantum teleportation devices, quantum encryption circuit/devices, and/or quantum networks. Also, it will be understood that any of the various actions can result in any type of electronic information and/or quantum information to be displayed in real-time and/or simultaneously on multiple user devices. Any electronic graphs and/or quantum information may be generated by a computing device, such as device 700, and displayed via a graphical user device (GUI) or cloud environment.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A quantum method, comprising:

receiving, by a quantum circuit, information of valid blocks to be published via a quantum blockchain; and storing, by the quantum circuit, a hash of a current block, within the valid blocks, and another hash of a previous valid block within the quantum blockchain, wherein the quantum method publishes a first valid block and next consequent valid blocks in a quantum distributed ledger, wherein the quantum distributed ledger is $$|QLedger\rangle = \sum_{i=1}^{M} \sqrt{\frac{H_i}{M}}\, |D_i, QH_i, QBH_{i-1}\rangle,$$

wherein:

M is a is a number of blocks stored in the quantum distributed ledger, $$\sqrt{\frac{H_i}{M}}$$

is a probability amplitude of each block in the quantum blockchain, wherein the probability amplitude protects the quantum blockchain from computing hacking and wherein H is a hash of one of the valid blocks, $|Di\rangle$ is a size n qubits stores data of an $i^{th}$ block, $|QH\rangle$ is a register, and $|QBH\rangle$ is another register of size k is used to store a hash of the previous block in the binary form such that if i−1=0 then $|BPH_{i-1}\rangle$ refers to the hash of the genesis block.

2. The method of claim 1, wherein the hash of the current block is stored by the quantum circuit as a probability amplitude of a basis state that implement the quantum blockchain.

3. The method of claim 1, wherein the hash of the current block is stored by the quantum circuit or as part of a basis state.

4. The method of claim 1, wherein $|D\rangle$ is a register of size n qubits that store data of the $i^{th}$ valid block.

5. The method of claim 4, wherein the data includes at least one transaction, a time stamp, a blocks' header information, or a block creator.

6. The method of claim 1, wherein an algorithm of the quantum circuit exponentially reduces memory space for the quantum blockchain when compared with a blockchain that does not use the quantum circuit.

7. The method of claim 1, wherein the quantum circuit includes a set of Toffoli gates, CNOT gates, quantum Not gates, and S operators.

8. The method of claim 1, wherein the quantum circuit includes a quantum gate $R_4(\theta)$ that is used to create a weighted basis states in the quantum blockchain, wherein the quantum gate $R_4(\theta)$ are 3-qubits controlled by a control qubit and has two target qubits.

9. The method of claim 1, a qubit $|GB\rangle$ determines whether the current block is a genesis block.

* * * * *